US010739172B2

(12) United States Patent
Binz et al.

(10) Patent No.: US 10,739,172 B2
(45) Date of Patent: Aug. 11, 2020

(54) MEASURING DEVICE

(71) Applicants: BUERKERT WERKE GMBH & CO. KG., Ingelfingen (DE); BUERKERT S.A.S., Triembach-au-Val (FR)

(72) Inventors: Dieter Binz, Hirschberg (DE); Hendrik Faustmann, Oehringen (DE); Yves Hoog, Maisonsgoutte (FR)

(73) Assignee: BUERKERT S.A.S., Triembach au Val ( * ) Notice: Subject to any disclaimer, the term of this patent is extended or adjusted under 35 U.S.C. 154(b) by 224 days.

(21) Appl. No.: 15/977,406

(22) Filed: May 11, 2018

(65) Prior Publication Data
US 2018/0335329 A1 Nov. 22, 2018

(30) Foreign Application Priority Data

May 17, 2017 (DE) .......................... 10 2017 110 736

(51) Int. Cl.
G01F 1/58 (2006.01)
G01N 29/00 (2006.01)
(Continued)

(52) U.S. Cl.
CPC .............. G01F 1/588 (2013.01); G01F 1/002 (2013.01); G01F 1/7082 (2013.01); G01F 15/02 (2013.01);
(Continued)

(58) Field of Classification Search
None
See application file for complete search history.

(56) References Cited

U.S. PATENT DOCUMENTS 4,186,600 A * 2/1980 Appel ..................... G01F 1/588
73/861.12
4,336,719 A * 6/1982 Lynnworth ............. G01F 1/667
73/861.27
(Continued)

FOREIGN PATENT DOCUMENTS

CN 103 398 748 A 11/2013
CN 104 019 860 A 9/2014
(Continued)

Primary Examiner — Paul M. West
Assistant Examiner — Mark A Shabman
(74) Attorney, Agent, or Firm — McNees Wallace & Nurick LLC

(57) ABSTRACT

A measuring device has a measuring tube to be traversed by a medium in a throughflow direction as well as a magneto-inductive measuring device and an acoustic measuring device, which each are arranged on the measuring tube. The magneto-inductive measuring device comprises at least one coil that generates a magnetic field extending through the interior of the measuring tube as well as two electrodes arranged on the measuring tube, which can pick up a measurement signal. The acoustic measuring device comprises at least one portion of a wall of the measuring tube that serves as a waveguide for surface acoustic waves and forms a boundary surface to the medium, and at least one transmitter for exciting surface acoustic waves in the waveguide and at least one receiver for receiving surface acoustic waves from the waveguide, which at a distance from each other are acoustically coupled to the waveguide, wherein the distance between transmitter and receiver is chosen such that acoustic waves excited by the transmitter at least sectionally can propagate through the medium. The transmitter and receiver of the acoustic measuring device are arranged in series with respect to the throughflow direction.

16 Claims, 3 Drawing Sheets

(51) Int. Cl.
  *G01F 15/02* (2006.01)
  *G01F 1/00* (2006.01)
  *G01N 29/24* (2006.01)
  *G01F 1/708* (2006.01)
  *G01F 1/66* (2006.01)
  *G01F 25/00* (2006.01)

(52) U.S. Cl.
  CPC ......... *G01N 29/00* (2013.01); *G01N 29/2412* (2013.01); *G01F 1/584* (2013.01); *G01F 1/667* (2013.01); *G01F 25/0007* (2013.01); *G01N 2291/2634* (2013.01)

(56) References Cited

U.S. PATENT DOCUMENTS

| | | | | |
|---|---|---|---|---|
| 5,280,727 | A * | 1/1994 | Hafner | G01F 1/584 |
| | | | | 73/861.11 |
| 8,844,359 | B2 * | 9/2014 | Dam | G01N 29/024 |
| | | | | 73/597 |
| 9,091,574 | B2 * | 7/2015 | Neven | G01F 1/584 |
| 9,163,967 | B2 * | 10/2015 | Lucas | G01F 1/74 |
| 9,689,846 | B2 * | 6/2017 | Faustmann | G01N 29/022 |
| 2006/0052963 | A1 * | 3/2006 | Shkarlet | G01F 1/668 |
| | | | | 702/108 |
| 2008/0016967 | A1 * | 1/2008 | Schrag | G01F 25/0007 |
| | | | | 73/861.12 |
| 2011/0239769 | A1 * | 10/2011 | Schmitt | G01B 17/025 |
| | | | | 73/632 |
| 2012/0036941 | A1 * | 2/2012 | Drahm | G01F 1/584 |
| | | | | 73/861.12 |
| 2012/0060591 | A1 * | 3/2012 | Faustmann | G01N 29/2462 |
| | | | | 73/64.53 |
| 2014/0144246 | A1 * | 5/2014 | Drahm | G01F 1/002 |
| | | | | 73/861.12 |
| 2017/0350865 | A1 * | 12/2017 | Kretzler | G01F 1/588 |
| 2018/0017419 | A1 * | 1/2018 | Rupp | G01F 1/588 |
| 2018/0335329 | A1 * | 11/2018 | Binz | G01F 1/7082 |

FOREIGN PATENT DOCUMENTS

| | | |
|---|---|---|
| DE | 10 2007 058 578 A1 | 6/2009 |
| DE | 10 2009 048 646 A1 | 3/2011 |
| DE | 10 2013 106 050 A | 12/2014 |
| JP | S63-101819 U | 10/1989 |

* cited by examiner

MEASURING DEVICE

FIELD OF THE INVENTION

This invention relates to a measuring device, in particular to a throughflow measuring device.

BACKGROUND

In systems that are traversed by a medium, in particular a liquid, it often is necessary to detect the throughflow quantity or also the flow velocity of the respective medium.

For this purpose, for example, magneto-inductive throughflow measuring devices (MID) are known. These devices operated according to the principle that charged particles in a medium flowing through a measuring tube are deflected by a magnetic field. Mostly, two coils are arranged on the measuring tube, which in the interior of the measuring tube generate a magnetic field perpendicular to the throughflow direction, wherein parallel to the magnetic field at least two electrodes are placed, on which the charged particles deflected by the magnetic field generate a measuring voltage. This measuring voltage is proportional to the flow velocity of the charge carriers and hence of the medium.

Another measuring method, by which among other things the traversed cross-section of a measuring tube can be determined, uses surface acoustic waves (SAW). For this measuring method the medium is in direct contact with an acoustic waveguide in which surface acoustic waves are excited, wherein the type and frequency of the surface waves are chosen such that a partial coupling out into the medium is effected. The volumetric sound waves generated run through the medium and are reflected on a surface bordering the medium such that they again impinge on the waveguide. There, a part of the volumetric sound waves again is coupled into the waveguide as surface acoustic waves and runs on in the same. On an acoustic receiver that is arranged on the waveguide at a distance from the transmitter, a characteristic signal thus is obtained, which allows conclusions to be drawn regarding the characteristic properties of the medium.

It is the object of the invention to create a compact measuring device that provides for a precise measurement of properties of a medium such as its flow velocity.

SUMMARY

The present invention provides which includes a measuring tube to be traversed by a medium in a throughflow direction as well as a magneto-inductive measuring device and an acoustic measuring device, which each are arranged on the measuring tube. The magneto-inductive measuring device comprises at least one coil that generates a magnetic field extending through the interior of the measuring tube, and two electrodes arranged on the measuring tube, which can pick up a measurement signal. The acoustic measuring device comprises at least one portion of a wall of the measuring tube that serves as a waveguide for surface acoustic waves and forms a boundary surface with respect to the medium, and at least one transmitter for exciting surface acoustic waves in the waveguide and at least one receiver for receiving surface acoustic waves from the waveguide, which at a distance from each other are acoustically coupled to the waveguide, wherein the distance between transmitter and receiver is chosen such that acoustic waves excited by the transmitter at least sectionally can propagate through the medium, and wherein transmitter and receiver of the acoustic measuring device are arranged in series with respect to the throughflow direction.

The measurement via the acoustic measuring device, which is carried out in addition to the measurement via the magneto-inductive measuring device, among other things allows the exact determination of the traversed cross-section of the measuring tube and thus together with the flow velocity obtained via the magneto-inductive measurement the determination of the throughflow quantity, i.e. of the volumetric flow rate of the medium. When the density of the medium is known, the mass flow rate thus can also be determined.

In addition, since the transmitter and receiver of the acoustic measuring device are arranged along the throughflow direction, a measurement of the flow velocity independent of the magneto-inductive measuring device also is possible, which additionally provides for an improvement of the measurement accuracy. This redundant method for measuring the flow velocity also is usable in media which include no or only few charged particles, in which the flow velocity cannot or only hardly be detected via the magneto-inductive measuring device.

The measuring tube can have any cross-section, as the exact traversed cross-sectional area can be determined via the acoustic measuring device in each measuring operation.

In this way, changes of the traversed cross-section also can be detected. Beside a current filling height of the measuring tube with the traversing medium, deposits on the inner wall of the measuring tube, for example lime deposits, or ablations, such as by corrosion or mechanical damage by the traversing medium, can be detected and hence be taken into account in the determination of the volumetric flow rate.

Preferably, the transmitter and receiver of the acoustic measuring device are designed such that the surface waves can be excited in individual wave pulses offset in time and the same can also be temporally resolved upon receipt. What preferably is measured at least is the intensity, frequency and/or runtime delay of the signals. From the evaluation of the signals several properties of the medium can be determined, beside the traversed cross-section of the measuring tube and the flow velocity e.g. also the density, viscosity and temperature of the medium.

Transmitter and/or receiver preferably operate piezoelectrically, in particular they can include piezoelectric interdigital transducers. Transmitter and/or receiver each can be formed by a piezoelectric transducer with interdigital electrodes that are mounted directly on the waveguide.

The waveguide here is defined as the shortest distance between transmitter and receiver along the measuring tube. The waveguide advantageously is an integral part of the measuring tube and formed by a wall portion of the measuring tube that extends between transmitter and receiver. The waveguide, however, can differ from the rest of the measuring tube, e.g. by the geometry of its outer and/or inner surface. Thus, it is possible to sectionally vary the shape of the surface and also the thickness of the measuring tube in the region of the waveguide in order to selectively cause differences in the propagation of the surface waves. The thickness of the waveguide can be chosen such that the excited surface waves propagate along both surfaces of the waveguide.

The wall thickness of the waveguide advantageously is the same along its entire longitudinal extension. This also is advantageous when a plurality of transmitters and/or receivers are mounted on the outer surface of the waveguide, as then all surface acoustic waves can propagate on the waveguide under identical conditions.

The transmitter and receiver of the acoustic measuring device preferably lie on a straight line along the waveguide, in particular on a straight line parallel to the throughflow direction. However, they might for example also be arranged on opposite portions of the wall of the measuring tube.

To achieve a sufficient travel path of the acoustic waves in the medium it was found to be advantageous when the distance between the transmitter and receiver of the acoustic measuring device at least corresponds to an inside diameter of the measuring tube.

The coils of the magneto-inductive measuring device preferably are arranged between the transmitter and receiver of the acoustic measuring device with respect to the throughflow direction. This allows a compact construction of the measuring device. In this way, the measurement data of both measuring devices also are collected in the same region of the measuring tube, which in particular provides for a more precise combination of the flow velocity obtained from the measurement data of the magneto-inductive measuring device with the measurement data collected by the acoustic measuring device, from which the traversed cross-section is obtained. In this way, in particular the current filling height and/or changes in cross-section due to deposits and/or ablations on the inner wall of the measuring tube are correctly taken into account.

A measuring surface of each of the electrodes of the magneto-inductive measuring device advantageously extends parallel to the inner wall of the measuring tube and can follow the curvature of this inner wall. Preferably, the electrodes are arranged opposite to each other on the measuring tube. Mostly, at least the measuring surfaces of the electrodes form a part of the wall of the measuring tube. They can also at least partly form the waveguide of the acoustic measuring device. Thus, the measuring surfaces of the electrodes extend at least approximately parallel to the magnetic field lines that extend in the interior of the measuring tube. An imaginary straight line that connects the centers of the measuring surfaces of the electrodes (with respect to the cross-section of the measuring tube) and in the case of flat electrodes also forms a surface normal of the measuring surfaces for example can extend perpendicularly to the magnetic field lines and to the throughflow direction and thus be approximately parallel to the direction of deflection of the charged particles in the medium.

In the operating condition, i.e. in the condition in which a measurement is carried out in the measuring device, the measuring tube preferably always has the same orientation. This orientation normally corresponds to a built-in condition in which the measuring tube is firmly mounted in a system traversed by the medium. In the operating condition, the measuring tube preferably is disposed horizontally in order to be able to keep the traversed cross-section as constant as possible along the length of the measuring tube.

In a preferred embodiment, transmitter and receiver in the operating condition are arranged on the portion of the measuring tube located at the bottom in the vertical direction. In this way, it is ensured that the waveguide always is in contact with the medium even with only partly filled cross-section of the measuring tube.

The magnetic field of the magneto-inductive measuring device then advantageously extends within the measuring tube in the vertical direction.

In principle, the vertical direction here always also comprises a tilt of the measuring tube of about +/−30° with respect to the exact vertical.

As seen in a cross-section of the measuring tube, the waveguide advantageously is arranged symmetrically with respect to a center of the imaginary connecting straight line between the electrodes of the magneto-inductive measuring device, so that with an only partly filled measuring tube the medium level approximately is the same at both electrodes. In the case of a circular cross-section the center of the connecting straight line coincides with the center of the cross-section of the measuring tube. The imaginary connecting straight line between the electrodes then preferably extends approximately horizontally. In this embodiment, the electrodes preferably are provided separate from the waveguide and in addition to the same.

In another preferred embodiment, by contrast, transmitter and/or receiver of the acoustic measuring device are arranged on one of the electrodes. The electrode can be configured as a part of the waveguide or can form the waveguide. Preferably, transmitter and receiver are arranged on the same electrode one behind the other in throughflow direction. Of course, it is also conceivable to arrange transmitter and receiver on different electrodes. Preferably, this embodiment is used with an always completely filled measuring tube.

In an operating condition, the electrodes of the magneto-inductive measuring device can extend in a lower region of the measuring tube, in particular in a region of about 0-50%, 0-40% or 0-30% of the height of the measuring tube along the vertical direction. In this way, low filling levels also can safely be detected.

In general, the electrodes can extend over about 10-100% of the height of the measuring tube in the vertical direction, preferably over 70-100% of the height of the measuring tube. The optimum vertical extension of the electrodes among other things depends on the shape of the cross-section of the measuring tube.

The electrodes can be embedded in the wall of the measuring tube, in particular such that they are not in contact with the medium. In this case, the electrodes act as a capacitor, and a capacitive signal pick-up is effected.

It is also possible, however, to arrange the electrodes directly on the inner wall of the measuring tube, so that they get in contact with the medium, wherein in this case a galvanic signal pickup is effected.

The coils preferably are arranged on an outer wall of the measuring tube.

Advantageously, there are provided two coils facing each other in the cross-section of the measuring tube, which generate the magnetic field. For example, one coil can be arranged at the top and the other at the bottom (based on the operating condition), so that the magnetic field along the cross-section of the measuring tube is perpendicular to the course of the measuring tube and hence perpendicular to the throughflow direction.

At least in the region of the magneto-inductive measuring device the inner wall of the measuring tube should be electrically non-conductive and/or non-magnetic, of course apart from the electrodes. To be able to transmit an electric signal to an external processing unit, of course the electrodes should always be electrically conductive.

It is possible to configure the measuring tube in two-layered form at least in the region of the magneto-inductive measuring device, wherein the inner layer is made of an electrically non-conductive and non-magnetic material. In particular, a thin inner tube made of plastics or ceramics, a so-called liner, can be inserted as an inner layer into a dimensionally stable outer tube, preferably made of a non-magnetic metal.

The waveguide of the acoustic measuring device always at least sectionally is a part of the tube wall, as it must always be possible to couple the surface acoustic waves into the medium. The waveguide, however, can be formed at will by a portion of the inner layer alone or by a portion of the inner layer together with the outer tube. This is dependent on the acoustic properties of the used materials and of the transition between the outer tube and the inner layer. It is also possible to arrange a separate material portion between the two layers and to use the same as a waveguide together with the underlying portion of the inner layer. Correspondingly, transmitter and receiver can be arranged between the inner layer and the outer tube.

Beside the determination of properties of the medium such as the flow velocity or the throughflow quantity, the throughflow device according to the invention can also be used for a method for the fault diagnosis of the measuring device and in particular of the measuring tube.

By a signal evaluation of the measurement signal of the acoustic measuring device for example the thickness of deposits, the depth of ablations, cracks, also microcracks, in the measuring tube, a detachment of the electrodes from the inner layer or the outer tube of the measuring tube or also generally gaps between tube wall and electrode or also between inner layer and outer tube can be detected. In this way, for example, minimal leakage points can also be detected.

DETAILED DESCRIPTION

Figure 1:
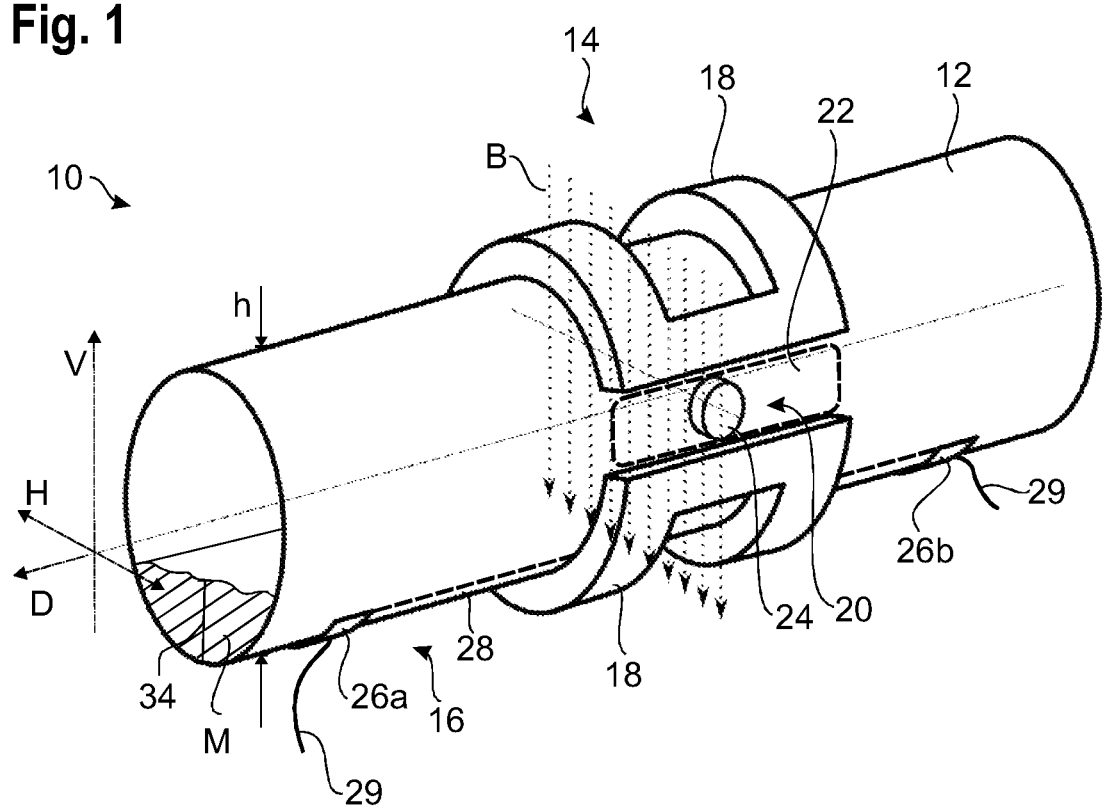
FIG. 1 shows a schematic perspective representation of a measuring device of the invention according to a first embodiment.
Figure 2:
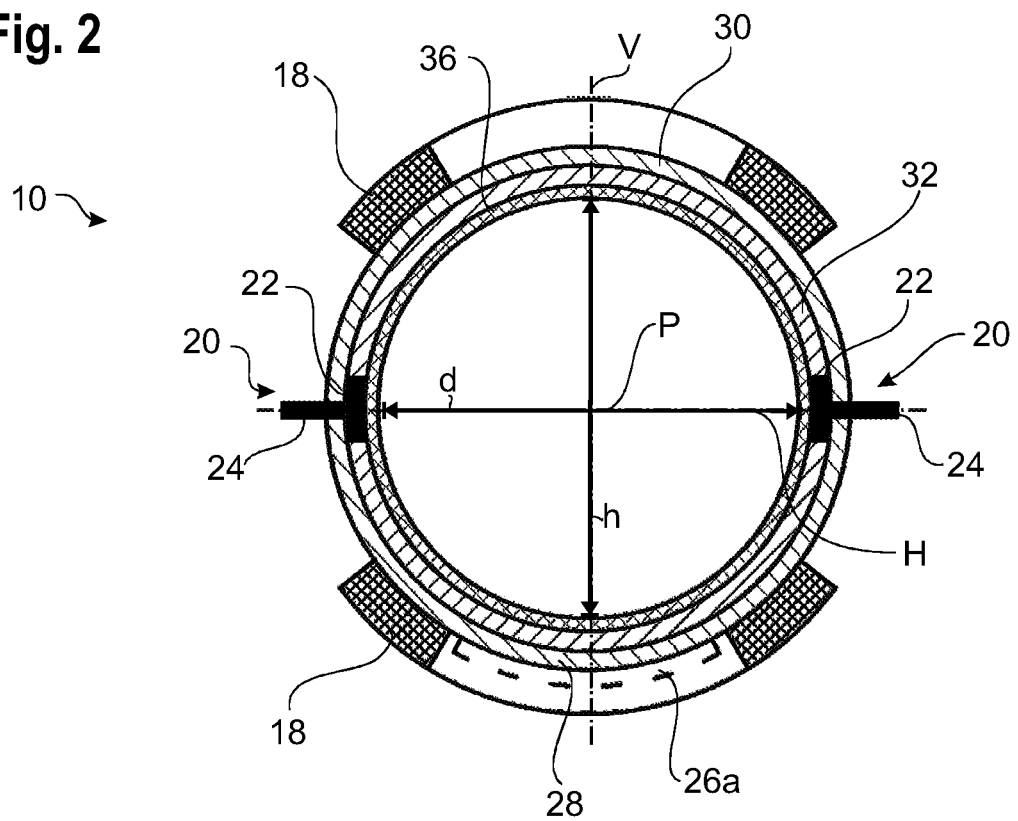
FIG. 2 shows a schematic sectional view of the measuring device of FIG. 1.

FIGS. 1 and 2 show a measuring device 10 according to a first embodiment.

The measuring device 10 comprises a linearly extending, elongate measuring tube 12 through whose interior a medium M can flow along a throughflow direction D that coincides with a longitudinal axis of the measuring tube 12.

The medium M can be any fluid, for example a liquid or a gas, but also an inhomogeneous liquid, e.g. a liquid interspersed with gas bubbles or containing solids. The medium can also be highly viscous, doughy, gel-like or pasty.

The Figures show the measuring device 10 in the orientation that it has in its operating condition for carrying out a measurement. This operating condition also corresponds to the built-in condition, in which the measuring tube 12 is firmly integrated into a suitable system. The measuring tube 12 extends in a horizontal H, i.e. perpendicularly to the vertical direction V.

On the measuring tube 12 a magneto-inductive measuring device 14 and an acoustic measuring device 16 are arranged.

The magneto-inductive measuring device 14 comprises two coils 18 arranged on the measuring tube 12 opposite each other in the vertical direction V and two electrodes 20 opposite each other in the horizontal direction H, which as seen in the throughflow direction D are level with the coils 18.

The electrodes 20 each have a measuring surface 22 that in its shape follows the inner wall of the measuring tube 12. The measuring surfaces 22 are electrically connected to a feed line 24 to be contacted from outside the measuring tube 12, wherein the measuring surface 22 has a larger expansion than the feed line 24. The feed line 24 serves to transmit a measuring signal generated at the electrodes 20 to a processing unit (not shown).

The acoustic measuring device 16 comprises one or more transmitters 26a and receivers 26b that are arranged on both sides of the coils 18 (along the throughflow direction D), and a waveguide 28 that extends between the transmitter 26a and the receiver 26b and forms a boundary surface with the medium M. The waveguide 28 is at least sectionally formed by the wall of the measuring tube 12. Transmitter 26a and receiver 26b are attached to a side of the waveguide 28 opposite the boundary surface with the medium M.

For generating and coupling out or for receiving surface acoustic waves into or out of the waveguide 28, transmitter 26a and receiver 26b can include so-called interdigital transducers that are applied directly onto the waveguide 28. The distance between transmitter 26a and receiver 26b here at least corresponds to the diameter of the measuring tube 12.

In this example, the transmitter(s) 26a also can be operated as receiver(s) 26b and vice versa, so that here a distinction is not explicitly made between transmitter and receiver.

Transmitter 26a and receiver 26b are electrically contacted via feed lines 29.

In this embodiment, transmitter 26a and receiver 26b as well as the interposed waveguide 28 are arranged on a lower portion of the measuring tube 12 with respect to the vertical direction V.

Figure 3:
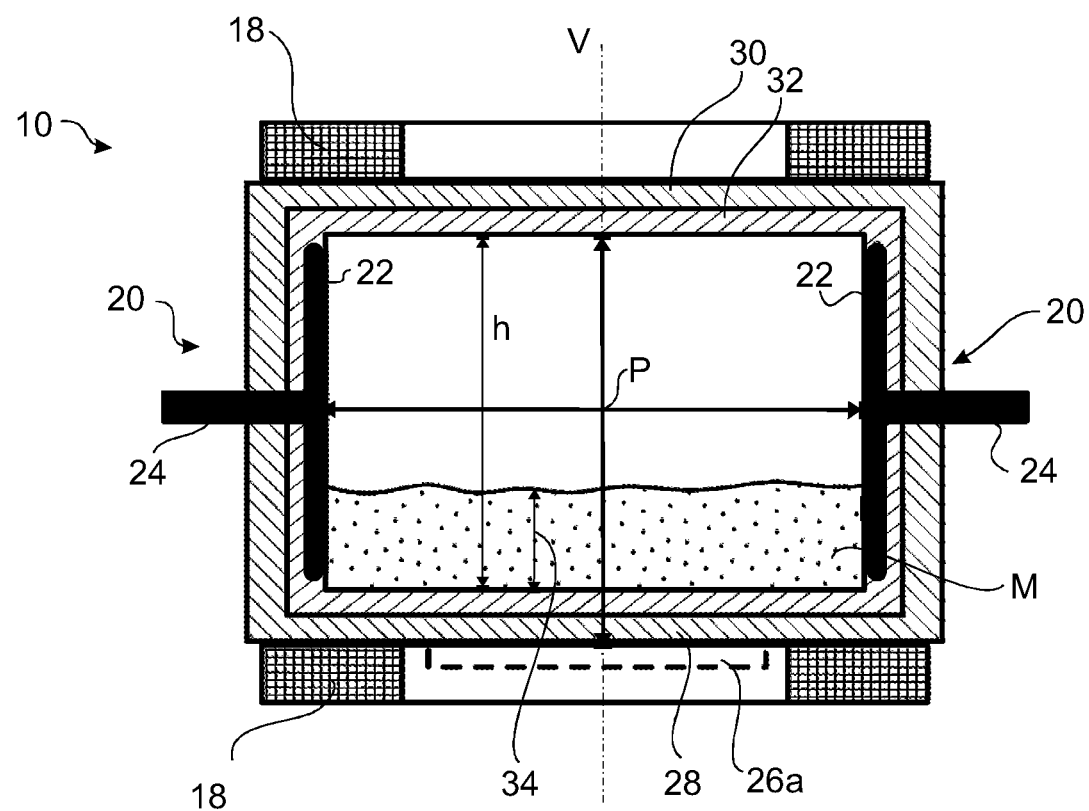
FIG. 3 shows a schematic sectional view of a measuring device of the invention according to a second embodiment.

The waveguide 28 is arranged symmetrically to a center P of an imaginary connecting straight line between the centers of the measuring surfaces 22 of the electrodes 20 (based on the cross-section of the measuring tube 12), as is indicated in FIGS. 2 and 3.

The measuring tube 12 in these examples is composed of two layers. Within a rigid, dimensionally stable outer tube 30 made of a non-magnetic metal a thin inner layer 32 (a so-called liner) made of a plastic or ceramic material is arranged, wherein the two layers thus formed are continuously and firmly connected to each other, for example glued together.

Alternatively, the measuring tube 12 also can be designed as one layer made of plastics or ceramics.

Figure 4:
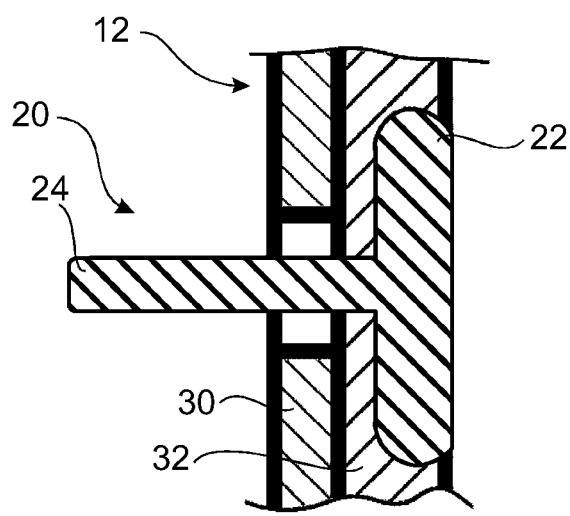
FIGS. 4 and 5 schematically show sectional views that reveal possible arrangements of the electrodes of the magneto-inductive measuring apparatus of the measuring device according to the invention.

In this example, the measuring surfaces 22 of the electrodes 20 are embedded into the inner layer 32 of the measuring tube 12 such that they are part of the inner wall of the measuring tube 12 and can get in contact with the medium M flowing through. In this case, the electrodes 20 are made of a corrosion-resistant material, for example stainless steel, a chromium-nickel alloy, platinum, tantalum or titanium. This arrangement once again is shown in detail in FIG. 4.

Figure 5:
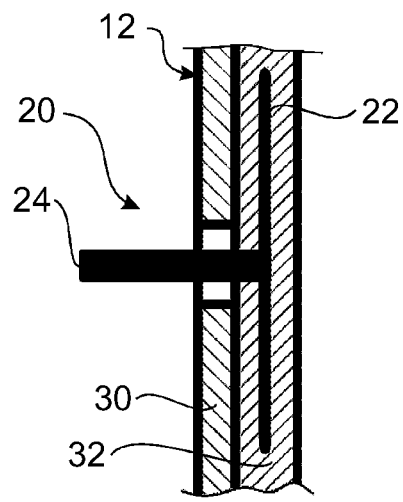

Alternatively, the measuring surface 22 of the electrode 20 is embedded into the wall of the measuring tube 12, in particular into the inner layer 32, so that the measuring surface 22 has no contact with the medium M. This variant is shown in FIG. 5.

The second embodiment of the measuring device 10 as shown in FIG. 3 substantially differs from the just described first embodiment in that the internal cross-section of the measuring tube 12 is rectangular and not circular, and in that the measuring surface 22 of the electrodes 20 is formed greater in the vertical direction V.

In the first embodiment, the vertical extension of the measuring surface 22 is limited to a small region above and below the horizontal diameter of the measuring tube 12 and occupies about 10% to 25% of the height h of the measuring tube 12 in the vertical direction V.

In the second embodiment by contrast the measuring surface 22 in principle extends over the entire height h of the measuring tube 12 in the vertical direction V.

In the second embodiment, the coils 18 are arranged on the upper side and the lower side of the measuring tube 12.

With both embodiments, a determination of the throughflow quantity is possible both for a completely filled measuring tube 12 and for a measuring tube 12 filled with medium M only up to a certain filling height 34. When the measuring tube is only partly filled with medium M, the cross-section of the measuring tube 12 located above the filling height 34 normally is filled with air.

With a measuring device 10 of the second embodiment, precise measurements also can be carried out at very low filling heights 34, as always a sufficient part of the measuring surface 22 of the electrodes 20 is in contact with the medium M.

Figure 6:
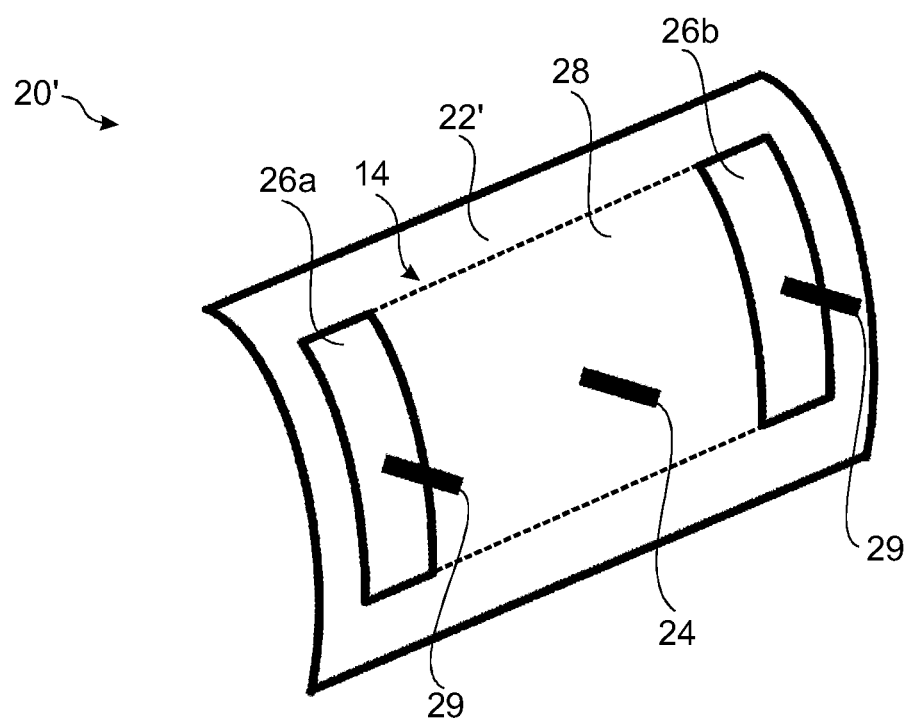
FIG. 6 shows a schematic representation of an electrode of a measuring device of the invention according to a third embodiment.

FIG. 6 schematically shows an electrode 20' of a measuring device 10 according to a third embodiment.

Transmitter 26a and receiver 26b here are arranged on the measuring surface 22' of the electrode 20'. The measuring surface 22' correspondingly is formed so long along the throughflow direction D that transmitter 26a and receiver 26b can be arranged at the same distance as in the embodiments described so far. Transmitter 26a and receiver 26b can be electrically conductively connected to the measuring surface 22' and are contacted via separate feed lines 29. The feed line 24 of the electrodes 22' at the same time can also form an electrical connection for the transmitter 26a and the receiver 26b.

The measuring surface 22' in this case also forms the waveguide 28 of the acoustic measuring device 14.

It is possible to form only one of the two electrodes 20' like this, but it is also possible that both electrodes 20' carry the transmitter 26a and/or receiver 26b.

The measuring device 10 according to this embodiment advantageously is always operated with a completely traversed cross-section of the measuring tube 12.

For determining a throughflow quantity, i.e. a volumetric flow rate, through the measuring tube 12 on the one hand a measurement is carried out by means of the magnetoinductive measuring device 14 in order to determine the flow velocity v of the medium M.

For this purpose, a specified current is passed through the coils 18, so that a magnetic field B is obtained, whose field lines extend in the interior of the measuring tube 12 along the vertical direction V.

Charged particles in the medium M are laterally deflected in the magnetic field B and impinge on the measuring surfaces 22 or 22' of the electrodes 20, 20' and there produce a charge transfer, so that a measuring voltage U is obtained at the electrodes 20, from which the flow velocity v of the medium M can be derived. It applies: U=k B d v, with k=proportionality factor, B=magnetic field and d=electrode distance (here the diameter of the measuring tube 12).

In addition, a measurement is carried out by means of the acoustic measuring device 16.

For this purpose, the transmitter 26a excites surface acoustic waves in the waveguide 28 directly below the transmitter 26a. These surface waves extend along the waveguide 28, among other things in the direction of the receiver 26b and are detected there.

Due to the direct boundary surface of the medium M to the waveguide 28, a part of the energy of the surface acoustic waves is coupled out on the inner wall of the measuring tube 12 at the boundary surface to the medium M and from there passes through the medium M as volumetric sound waves at a propagation angle δ. On the opposite wall of the interior space of the measuring tube 12 the volumetric sound wave is partly reflected. In the most frequent case, in which the sound velocity cM in the medium M is smaller than the sound velocity cS of the surface waves in the waveguide 28, volumetric sound waves are coupled out at an angle δ=arcsin $(C_M/C_S)$ different from 0, and the volumetric sound waves cover a spatial distance along the waveguide 28, possibly by multiple reflection within the medium M. In this way, the volumetric sound wave propagates through the medium M along the measuring tube 12.

To be able to couple surface sound waves excited on the side of the waveguide 28 opposite the boundary surface with the medium into the medium, Lamb waves preferably are excited, i.e. waves whose wavelength is much longer than the thickness of the waveguide 28 (i.e. in particular the wall thickness of the measuring tube 12) between transmitter 26a and medium M. In this case, both the upper and the lower side of the waveguide 28 move, wherein the vibration also has a longitudinal component. Therefore, this type of excitation is suitable for coupling out volumetric sound waves. It is also possible to choose the wavelength of the excited surface acoustic waves in the order of magnitude of the thickness of the waveguide 28, with surface waves then being excited in a transition region between Lamb waves and Rayleigh waves.

When the thickness of the waveguide is 28 distinctly smaller than the wavelength of the surface acoustic waves, the amplitude of the excited Lamb waves substantially is identical on both surfaces of the waveguide 28. On the other hand, when the thickness of the waveguide 28 lies in the same order of magnitude as the wavelength of the surface acoustic waves, the amplitude of the surface waves generally differs between the surface on which the surface wave is excited and the opposite surface. In both cases, however, it is possible to couple out longitudinal volumetric sound waves, as on both surfaces the surface sound waves also each have a longitudinal component.

Whenever the volumetric sound wave coupled out impinges on the inner wall of the measuring tube 12, it is possible that surface acoustic waves in turn are coupled into the waveguide 28. The same then run through the waveguide 28 to the receiver 26b and likewise are received there.

Transmitter 26a and receiver 26b can be operated such that the surface waves are emitted in or against the throughflow direction D.

When the excitation of the surface sound waves by the transmitter 26a is effected in individual wave pulses, it is favorable to choose the time interval between two wave pulses such that both the direct surface waves and all detectable volumetric sound waves already have arrived at the receiver 26b, before the next pulse is triggered.

By an analysis of the received acoustic signal, for example as regards the runtime delay between a wave pulse emitted by the transmitter 26a and the signal arriving at the receiver 26b, and via the time course of the received signal conclusions can be drawn among other things regarding the traversed cross-section and properties of the medium M, for example its concentration, viscosity, density, sound velocity, temperature and homogeneity. It is also possible to determine the flow velocity v of the medium M through the measuring tube 12 solely from the acoustic measurement. The measuring device 10 thus can also be used as a multifunction measuring device for different properties of the medium M.

Above all, however, the exact traversed cross-section of the measuring tube 12 in the region of the magneto-inductive measuring device 14 according to the invention is determined by means of the acoustic measurement. Together with the flow velocity v this results in the throughflow quantity.

The traversed cross-section of the measuring tube 12 of course depends on the filling height 34, but also on the condition of the inner wall of the measuring tube 12. Here, deposits 36 can form for example (see FIG. 2 by way of example), by which the original cross-section is narrowed. On the other hand, corrosion or abrasion also can lead to ablations, so that the original cross-section is increased in the course of time. The acoustic measurement, however, always reflects the actual condition of the measuring tube 12.

The evaluation of the measurement signals of the magneto-inductive measuring device 14 and of the acoustic measuring device 16 is effected in a specific, non-illustrated electronic control unit of the measuring device 10. This electronic control unit normally is also responsible for carrying out the measurement, i.e. for the time-controlled generation of a current flow through the coils 18 and the generation of the surface waves through the respective transmitter 26a.

Due to the possibility of determining the flow velocity v also solely by means of the acoustic measuring device 16, the measuring device 10 can also be used for media with a low electric conductivity and a correspondingly small number of charged particles.

In addition, the acoustic measuring device 16 also provides for a fault diagnosis for the measuring device 10 by means of the evaluation of the acoustic signals that are measured by the receiver 26b. In this way, for example with reference to deviations of the measured signal from the signal obtained during a measurement with a new measuring tube, in particular cracks in the measuring tube 12 or the formation of a gap between the inner layer 32 and the outer tube 30 of the measuring tube 12 can be detected already at an early stage.

The invention claimed is:

1. A throughflow measuring device, comprising a measuring tube to be traversed by a medium in a throughflow direction as well as a magneto-inductive measuring device and an acoustic measuring device, which each are arranged on the measuring tube, wherein the magneto-inductive measuring device comprises at least one coil that generates a magnetic field extending through the interior of the measuring tube, and two electrodes arranged on the measuring tube, which can pick up a measurement signal, and wherein the acoustic measuring device comprises at least one portion of a wall of the measuring tube that serves as a waveguide for surface acoustic waves and forms a boundary surface to the medium, and at least one transmitter for exciting surface acoustic waves in the waveguide and at least one receiver for receiving surface acoustic waves from the waveguide, which at a distance from each other are acoustically coupled to the waveguide, wherein the distance between transmitter and receiver is chosen such that acoustic waves excited by the transmitter can at least sectionally propagate through the medium, wherein the transmitter and receiver of the acoustic measuring device are arranged in series with respect to the throughflow direction, wherein the coils of the magneto-inductive measuring device are arranged between the transmitter and receiver of the acoustic measuring device with respect to the throughflow direction.

2. The throughflow measuring device according to claim 1, wherein the waveguide is formed by a portion of the wall of the measuring tube that extends between transmitter and receiver.

3. The throughflow measuring device according to claim 1, wherein the distance between transmitter and receiver of the acoustic measuring device along the throughflow direction is equal to or larger than an inside diameter of the measuring tube.

4. The throughflow measuring device according to claim 1, wherein a measuring surface of each of the electrodes extends parallel to the inner wall of the measuring tube.

5. The throughflow measuring device according to claim 1, wherein in an operating condition transmitter and receiver rest against the portion of the measuring tube located at the bottom in the vertical direction.

6. The throughflow measuring device according to claim 1, wherein in an operating condition the magnetic field of the magneto-inductive measuring device extends within the measuring tube in the vertical direction.

7. The throughflow measuring device according to claim 1, wherein as seen in a cross-section of the measuring tube the waveguide is arranged symmetrically with respect to a center of an imaginary connecting straight line between the electrodes.

8. The throughflow measuring device according to claim 1, wherein the electrodes are embedded into the wall of the measuring tube.

9. The throughflow measuring device according to claim 1, wherein the electrodes are embedded into the wall of the measuring tube such that they are not in contact with the medium.

10. The throughflow measuring device according to claim 1, wherein the electrodes are arranged on the inner wall of the measuring tube and in contact with the medium.

11. The throughflow measuring device according to claim 1, wherein the coils are arranged on an outer wall of the measuring tube.

12. The throughflow measuring device according to claim 1, wherein there are provided two coils facing each other in the cross-section of the measuring tube.

13. The throughflow measuring device according to claim 1, wherein at least in the region of the magneto-inductive measuring device the inner wall of the measuring tube is electrically non-conductive and/or non-magnetic.

14. The throughflow measuring device according to claim 13, wherein the measuring tube is configured in two-layered form at least in the region of the magneto-inductive measuring device, wherein the inner layer is made of an electrically non-conductive and non-magnetic material.

15. A throughflow measuring device, comprising a measuring tube to be traversed by a medium in a throughflow direction as well as a magneto-inductive measuring device and an acoustic measuring device, which each are arranged on the measuring tube, wherein the magneto-inductive measuring device comprises at least one coil that generates a magnetic field extending through the interior of the measuring tube, and two electrodes arranged on the measuring tube, which can pick up a measurement signal, and wherein the acoustic measuring device comprises at least one portion of a wall of the measuring tube that serves as a waveguide for surface acoustic waves and forms a boundary surface to the medium, and at least one transmitter for exciting surface acoustic waves in the waveguide and at least one receiver for receiving surface acoustic waves from the waveguide, which at a distance from each other are acoustically coupled to the waveguide, wherein the distance between transmitter and receiver is chosen such that acoustic waves excited by the transmitter can at least sectionally propagate through the medium, wherein the transmitter and receiver of the acoustic measuring device are arranged in series with respect to the throughflow direction wherein the transmitter and/or the receiver is arranged on one of the electrodes.

16. A throughflow measuring device, comprising a measuring tube to be traversed by a medium in a throughflow direction as well as a magneto-inductive measuring device and an acoustic measuring device, which each are arranged on the measuring tube, wherein the magneto-inductive measuring device comprises at least one coil that generates a magnetic field extending through the interior of the measuring tube, and two electrodes arranged on the measuring tube, which can pick up a measurement signal, and wherein the acoustic measuring device comprises at least one portion of a wall of the measuring tube that serves as a waveguide for surface acoustic waves and forms a boundary surface to the medium, and at least one transmitter for exciting surface acoustic waves in the waveguide and at least one receiver for receiving surface acoustic waves from the waveguide, which at a distance from each other are acoustically coupled to the waveguide, wherein the distance between transmitter and receiver is chosen such that acoustic waves excited by the transmitter can at least sectionally propagate through the medium, wherein the transmitter and receiver of the acoustic measuring device are arranged in series with respect to the throughflow direction wherein in an operating condition the electrodes extend into a lower half of the measuring tube with regard to the vertical direction and the electrodes extend over 70% - 100% of a height of the measuring tube in the vertical direction.

* * * * *